(12) United States Patent
Klingelnberg

(10) Patent No.: US 6,481,307 B1
(45) Date of Patent: Nov. 19, 2002

(54) BEVEL GEAR PAIR

(75) Inventor: Diether Klingelnberg, Hückeswagen (DE)

(73) Assignee: Klingelnberg GmbH, Huckeswagen (DE)

( * ) Notice: Subject to any disclaimer, the term of this patent is extended or adjusted under 35 U.S.C. 154(b) by 37 days.

(21) Appl. No.: 09/644,625

(22) Filed: Aug. 23, 2000

Related U.S. Application Data

(63) Continuation-in-part of application No. 08/945,995, filed as application No. PCT/EP96/02015 on May 10, 1996, now abandoned.

(30) Foreign Application Priority Data

May 11, 1995 (DE) .......................... 195 17 359

(51) Int. Cl.[7] .............................. F16H 55/08
(52) U.S. Cl. ........................ 74/459.5; 74/462
(58) Field of Search ............. 451/47, 57; 74/459.5, 74/462

(56) References Cited

U.S. PATENT DOCUMENTS

| | | | |
|---|---|---|---|
| 1,822,846 A | | 9/1931 | Wildhaber |
| 1,879,089 A | | 9/1932 | Christman |
| 2,279,216 A | | 4/1942 | Way |
| 2,436,276 A | * | 2/1948 | Wildhaber .................. 74/459.5 |
| 3,605,518 A | * | 9/1971 | Haller ........................ 74/459.5 |
| 3,768,326 A | * | 10/1973 | Goergiev et al. ........... 74/459.5 |
| 3,813,821 A | | 6/1974 | Takahashi et al. |
| 3,909,990 A | | 10/1975 | Tersch |
| 5,044,127 A | | 9/1991 | Ryan |
| 5,079,877 A | | 1/1992 | Abysov et al. |
| 5,090,161 A | | 2/1992 | Nakayama |
| 5,255,475 A | | 10/1993 | Kotthaus |
| 5,775,975 A | | 7/1998 | Mizuno et al. |

FOREIGN PATENT DOCUMENTS

| | | | |
|---|---|---|---|
| DE | 34 25 800 | 1/1986 | |
| DE | 38 26 029 | 2/1990 | |
| DE | 43 13 533 | 10/1994 | |
| DE | 19517359 C1 | 7/1996 | |
| EP | 0 229 894 | 7/1987 | |
| JP | 341508 | * 6/1994 | ................ 74/459.5 |

OTHER PUBLICATIONS

"Zahnradfertigung", Thomas Bausch, expert verlag 1986, part B, pp. 470, 471, 516–519.
"WNC 30", Oerlikon Geartec AG, Zurich, Switzerland.
"T 20", Oerlikon Geartec AG, Zurich, Switzerland.
"Oerlikon Spiromatic contex T20 CNC–Kegelradtester", Oerlikon Geartec AG, Zurich, Switzerland.

* cited by examiner

*Primary Examiner*—George Nguyen
(74) *Attorney, Agent, or Firm*—McCormick, Paulding & Huber LLP

(57) ABSTRACT

In a bevel gear pair including a first gear having a plurality of first gear teeth, each defined at least in part by a tooth route and concave and convex flank surfaces, the concave and convex flank surfaces each define a first surface structure formed by grinding. This first surface structure is in turn defined by a plurality of microstriations extending diagonally across the convex and concave flank surfaces. A second gear also includes a plurality of gear teeth adapted to mesh with the gear teeth of the first gear. Each of the second gear teeth is also defined in part by a tooth route and concave and convex flank surfaces. The concave and convex flank surfaces of the second gear define a second surface structure formed by grinding followed by honing. This second surface structure includes a plurality of microstriations; however, unlike the microstriations of the first surface structure, these are parallel to the route of each of the second gear teeth. This allows the first and second gears to be produced in unmatched pairs, yet be operated together at noise levels approaching those of matched lapped bevel gear pairs.

1 Claim, 8 Drawing Sheets

BEVEL GEAR PAIR

CROSS REFERENCE TO RELATED APPLICATIONS

This application is a continuation in part of U.S. patent application Ser. No. 08/945,995, entitled "Bevel Gear Pair" filed on Nov. 6, 1997, now abandoned resulting from nationalization in the United States of PCT application PCT/EP96/02015 claiming priority of German Patent Application No. 195 17 359.7 filed on May 11, 1995 and entitled "Bevel Gear Pair" to Klingelnberg, all of said applications being incorporated herein by reference.

FIELD OF THE INVENTION

The present invention relates generally to bevel gear pairs, and is more specifically directed to a bevel gear pair wherein a ring gear and pinion are formed having different flank surface finishes such that unmatched gears can be used in sets and still maintain acceptable noise generation limits.

BACKGROUND OF THE INVENTION

A high degree of noise reduction in automobiles having offset axles is achieved using bevel gear pairs. In the conventional manufacture of bevel gear pairs consisting of a ring gear and pinion, the teeth of individual gears are cut and hardened, and then the gears are lapped. Lapping is accomplished by running the gears together, usually in the presence of an abrasive lapping compound, until an acceptable noise level for the gear pair is achieved. The configuration of these gears results in high sliding speed over the flanks of the gear teeth, thereby making these gears particularly well suited to the lapping process. A drawback associated with this method of gear production is that once the gear pair is lapped, the gears must be stocked, mounted, or replaced in matched sets.

European patent number EP 0 229 894 B1 discloses a process for manufacturing hypoid gears whereby the gears are cut by first milling, and then the gears are case hardened and lapped in batches. Pairs of ring and pinion gears are identified during lapping and must be kept together subsequent thereto. A drawback of this process is that although the lapping process improves running noise of the gear pairs, concentricity errors and local eccentricities created as a result of distortion during hardening remain. If the resulting noise level is unacceptable, other fine machining techniques must be employed, many of which are set forth in patent number EP 0 229 894 B1.

For obvious reasons, it is desirable to eliminate the necessity of having to supply bevel gear pairs in matched sets. To this end, the above-described European Patent discloses a continuous grinding process whereby distortion due to hardening, as well as concentricity errors, and eccentricities can be reduced. However, this process does not produce gears that operate at lower noise levels than those manufactured by the above-described machining, hardening and lapping process.

The difficulties in achieving the noise standards necessary for bevel gears pairs used in passenger cars will now be explained with reference to FIGS. 1–4 which show structure borne noise measurements made for a bevel gear pair ground on a spiral gear grinding machine type WNC 30 made by Oerlikon Geartec AG, Zurich. The gear pair was then tested on a Spiromat T 20 also made by Oerlikon Geartec. The graphs of FIGS. 1–4 were determined by employing a program referred to as "Mess Top". The acceleration level spectrum mV versus the frequency in Hz is plotted in the figures with the gear meshing frequency being approximately 320 Hz. Acceptable noise levels are those that are between the vertical bars illustrated in the figures. The operating principle upon which the graphs in FIGS. 1–4 were arrived at is based on an analysis of structure-borne noise by means of a seismic sensor. This method of analysis is described in detail in the Oerlikon company publications "Oerlikon Spiromatic contex T20 CNC Kegelradtester, Einflankenwälzprüfung und Körperschallanalyse" [Oerlikon Spiromatic contex T20 CNC Bevel Gear Tester, Single Flank Generating Testing and Analysis of Structure Borne Noise], December 1990, 9202/WA 410 935d. With respect to a ground bevel gear pair, the tooth engagement frequency, and the first and second harmonics thereof, are generally critical.

FIG. 1 shows the results for a first optimization of the gear pair tested. The tooth engagement frequency as well as the first and second harmonics lie inside of the vertical bars, that is between the lines indicating an acceptable noise level. However, on the traction or drive side of the gears, the noise levels fall outside of acceptable limits.

FIG. 2 shows that by further optimization of the gear tooth geometry, it was possible to reduce the frequency on the traction side from 60 mV to less than 20 mV, and from 50 mV on the coast side to approximately 30 m. However, there is a wide noise scatter adjacent the tooth engagement frequency, as well as near the harmonics of that frequency. Normally, this random noise is not unpleasant to the human ear. However, if, as is the case in FIG. 2, a periodicity is associated with this scatter, the generated noise can be unpleasant to the human ear.

FIG. 3 illustrates noise test results after the gear pair was ground further from the condition in which the results in FIG. 2 were obtained. The periodic noise bands are clearly distinguishable on the thrust side and the second harmonic exceeds the permissible threshold noise level at 635 Hz.

The results shown in FIG. 4 were obtained after the gears were lapped. The scatter band noise levels were dramatically reduced. However, the lapping step requires, inter alia, increased machining time, and thereby cost. While the same results can be obtained by finish grinding the gears, this too increases machining times and cost. Another problem associated with lapping results from the abrasive materials sprayed between the gear teeth. During the lapping process, grains of this hard abrasive material become embedded into the gear flank surfaces due to the high pressures generated between the gears. These particles often remain embedded in the finished gears, and can cause excessive wear during operation. In addition, in automotive applications, these particles can become dislodged from the gear surfaces and be carried to bearings by engine lubricating oil where permanent bearing damage can occur. The resultant bearing wear can cause improper gear tooth meshing and increased noise generation.

Another manner by which bevel gear pairs have been machined is disclosed in German patent number DE 34 25 800 A1 whereby the gear tooth flanks are honed after heat treatment. A drawback associated with this method is that the bevel gears must be pre-treated and hardened extremely accurately so that the post-hardening distortion is kept to a minimum. This is due to the fact that honing removes material very slowly and is expensive so that large distortion due to heat treatment would be time consuming and expensive to correct.

Another manner by which bevel gear pairs are finished is set forth in patent number DE 38 26 029 C2 and consists of finishing the gear teeth after hardening by strip hobbing the teeth of one of the gears and grinding the teeth of the other. Strip hobbing basically consists of post-hardening milling of the gear teeth. The use of two different machining operations is thought to achieve lower operating noise levels by employing a gear pair where one gear has a comparatively smooth flank and one a rough surface. However, since the above-described strip hobbing and grinding is done after hardening, extra machining operations as well as expensive hardened tools are required. In addition, because the extent of distortion after hardening is unpredictable, repeatability from gear pair to gear pair is uncertain.

Based on the foregoing, it is apparent that the noise characteristic of a bevel gear pair is substantially determined by the geometric meshing relationship between the ring gear and pinion. Accordingly, it is the general object of the present invention to provide a bevel gear pair that overcomes the problems and drawbacks of prior art gears.

It is a more specific object of the present invention to provide a bevel gear pair capable of operation within acceptable noise limits without the necessity of maintaining and using the gears in matched sets.

SUMMARY OF THE INVENTION

To allow for a detailed analysis of the noise behavior of a bevel gear pair, the micro-geometry in the contact zone between the flanks of meshing gears must be considered. To accomplish this, two gear flank surface characteristics need to be recognized, namely, the surface texture including microstriations, and surface micro-undulation. As used herein, the term microstriation refers to successively oriented machining marks that appear as scratch-like marks on the gear flank. The microstriations are formed by grinding, honing or like single direction material removal operations.

The term micro-undulation refers to surface irregularities created by movement of a grinding tool during a grinding operation.

The present invention resides in a bevel gear pair comprising a first gear having a plurality of first gear teeth, each defined at least in part by a tooth root, and corresponding convex and concave flank surfaces. The flank surfaces of the first gear each define a first surface structure formed by grinding. This operation creates microstriations extending diagonally across each concave and convex gear flank surface. A second gear includes a plurality of second gear teeth adapted to mesh with the teeth of the first gear. Each of the plurality of second gear teeth also defines a root, and a concave and convex flank surface. The convex and concave flank surfaces of the second gear define a second surface structure formed by grinding followed by honing. The topography of the second surface structure is defined by microstriations extending across each flank surface approximately parallel to the respective gear tooth root. During operation, as the first and second gears mesh together, the microstriations of the flank surfaces of the gears are offset relative to each other such that the noise frequency generated by each gear tends to cancel the noise frequency generated by the other gear. These offset microstriations allow unmatched gear pairs to operate within acceptable noise limits.

An advantage of the present invention is that with gears made in the above-described manner, it is no longer necessary to store a ring gear and pinion together as a matched set.

Another advantage of the present invention is that the grinding process need not be performed with the accuracy required by the prior art, thereby reducing manufacturing time and cost.

DETAILED DESCRIPTION OF THE PREFERRED EMBODIMENT

Figure 6:
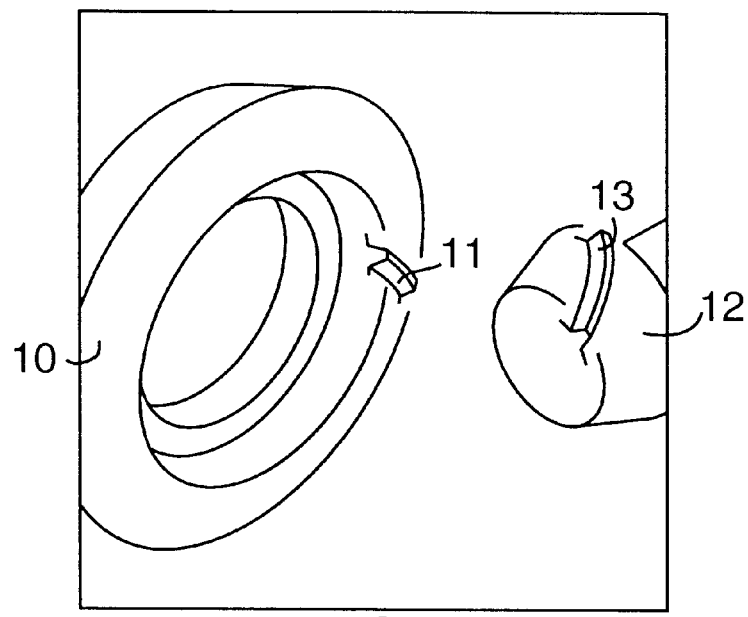
FIG. 6 schematically illustrates a bevel gear pair consisting of a ring gear and a pinion.

As shown in FIG. 6, a bevel gear pair which can be produced by means of the process and on the machine described below consists of a ring gear 10 having a plurality of spiral teeth 11 (only one tooth shown). A pinion 12 is also illustrated and has a plurality of spiral teeth 13 (only one tooth shown) adapted to mesh with the teeth on the ring gear 10. It is assumed that both sets of gear teeth have been initially produced by milling and case-hardening; however, the present invention is not limited in this regard as other gear manufacturing methods known to those skilled in the pertinent art to which the invention pertains, can be employed without departing from the broader aspects of the present invention.

Figure 7:
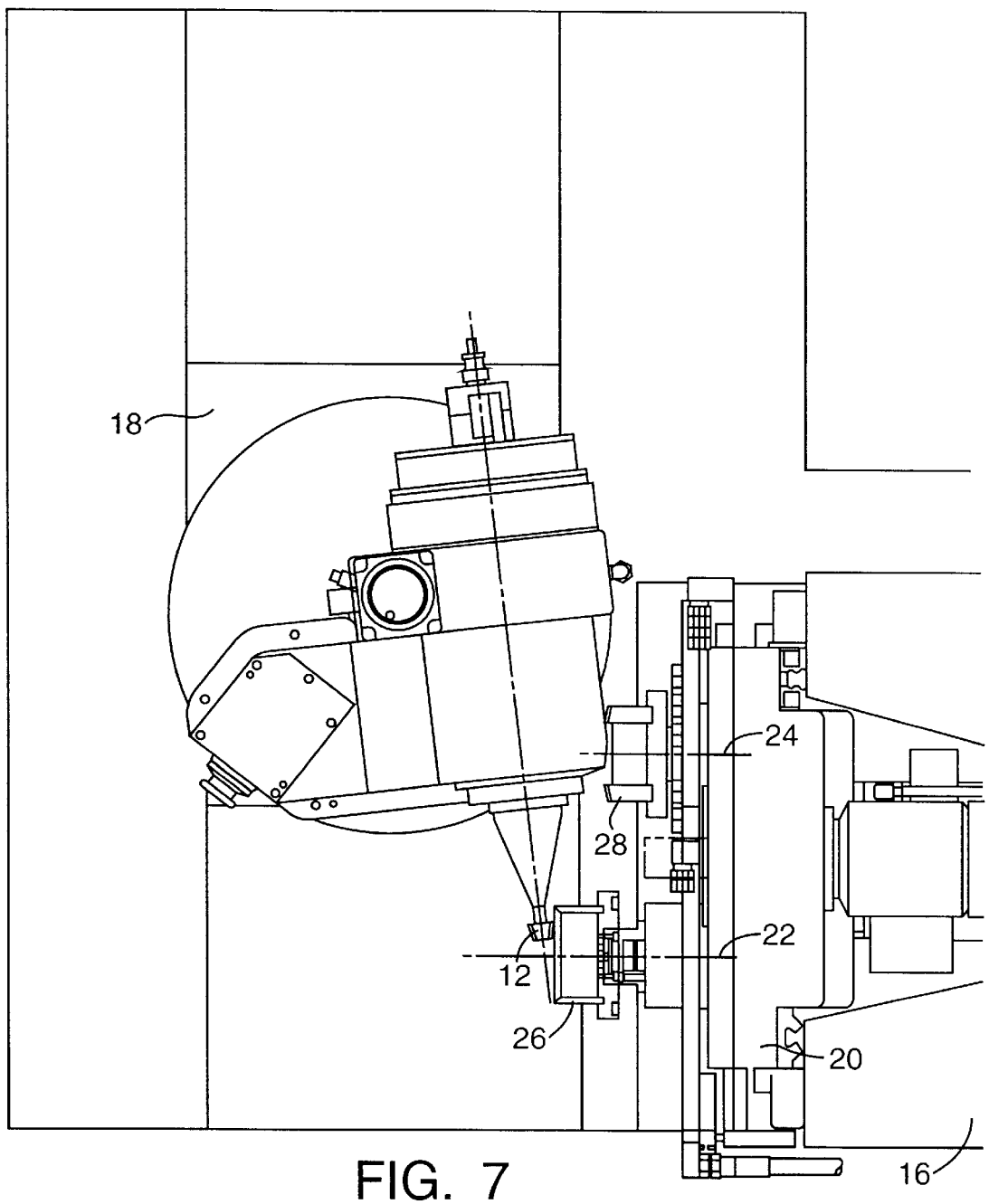
FIG. 7 is a partial plan view of a machine for finishing the pinion of a bevel gear pair by grinding the teeth of the pinion using a cup-shaped grinding wheel.
Figure 8:
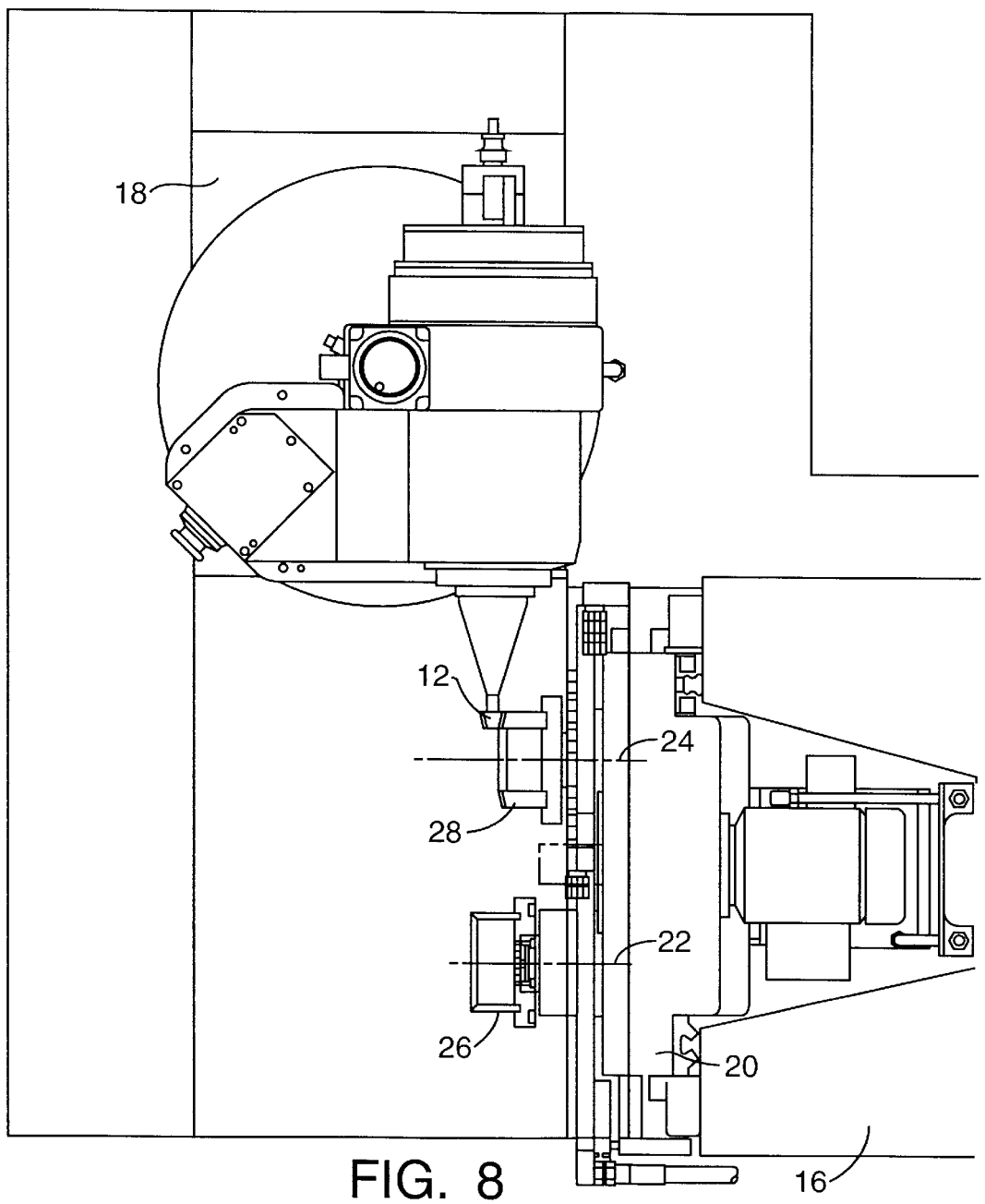
FIG. 8 is a partial plan view of the machine of FIG. 7 shown honing of the pinion with the aid of a honing ring gear subsequent to grinding.

Generally the gear teeth 11 and 13 of the ring gear and pinion, 10 and 12 respectively, are ground on a spiral gear wheel generating/grinding machine 14 such as is shown in FIGS. 7 and 8. This machine 14 is employed to remove distortion created as a result of the gear hardening operation. This distortion can take the form of, inter alia, concentricity errors and eccentricities. The machine can also be used to create a desired gear flank surface topology.

A gear generating machine of the type illustrated in FIGS. 7 and 8 is the VINC 30 mentioned herein above. All profile modifications, such as positive and negative height crowning, defined tip and root relief, longitudinal crowning, root rounding radii of gear teeth and arbitrary corrections of the pressure angle, can be produced without problems on such a machine.

Still referring to FIGS. 7 and 8, the machine 14 includes a horizontally movable housing 16 having a horizontal carriage 18 and a vertical carriage 20, each movably mounted thereon. During operation of the machine 14, a gear can be generated via the cooperative motion of the horizontal and vertical carriages 18 and 20, respectively, relative to, in the illustrated example, a rotating pinion 12. The machine 14 has two spindles 22, 24, each defining a central axis and supporting a processing head for chucking a processing tool 26 or 28. In the embodiment shown in FIG. 7, the pinion 12 is being machined by the processing tool 26, which is a cup-shaped grinding wheel. Subsequent to being machined by the cup-shaped grinding wheel 26, and as shown in FIG. 8, the processing tool 28, which in the illustrated embodiment is a ring gear-like honing is employed to hone the flank surfaces of the pinion 12.

Preferably, the ring gear like honing tool 28 is made of corundum; however, the present invention is not limited in this regard as other ring gear like honing tools can be provided, for example, a tool having hardened or abrasive tooth flanks, without departing from the broader aspects of the present invention. The honing tool 28 is moved into the position shown in FIG. 8 by means of the horizontal carriage 18 and brought into engagement with the honing wheel 28, so that the gear teeth of the pinion 12 are while in the same chucking arrangement as during grinding.

Unlike the pinion 12 which has been described above as having been ground and honed, the ring gear 10 in the bevel gear pair of the present invention is only ground. However, the present invention is not limited in this regard as the machining processes can be switched, that is, the ring gear can be ground and honed, and the pinion only ground, without departing from the broader aspects of the present invention.

Figure 9:
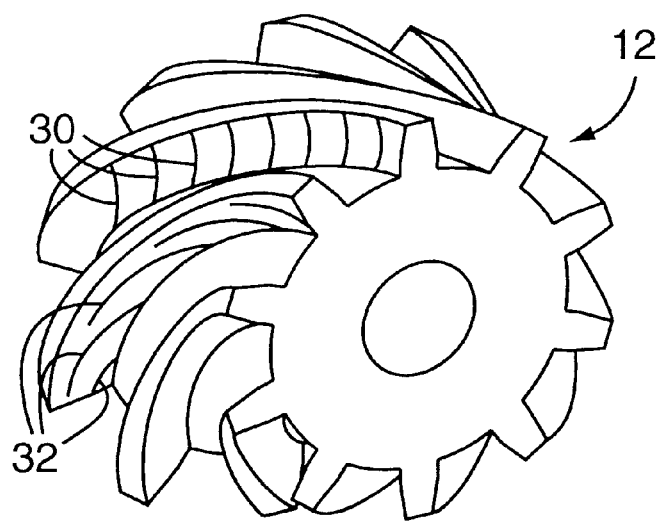
FIG. 9 illustrates the orientation of surface microstriations present on a gear tooth flank as a result of grinding one gear, and finishing the other gear by a combination of grinding and honing.

Referring to FIG. 6, as well as to FIG. 9, the above-described machining operations, i.e. grinding and honing, and grinding alone, create differences in the surface structure on the convex and concave flanks of the gear teeth 11 and 13 of the ring gear and pinion, 10 and 12 respectively. Upon completion of either a grinding and honing operation, or simply a grinding operation, the flank surfaces of the gear teeth are characterized by a plurality of scratch-like machining marks typically oriented in a side-by-side relationship relative to one another. These machining marks are referred to as microstriations. The orientation of the microstriations differ depending on the machining operation. FIG. 9 is illustrative of the microstriation orientation for grinding and honing 30, and for grinding only 32. These microstriations are shown on the flank surfaces of a single pinion for illustrative purposes only as under normal conditions a respective one of the pinion and ring gear would have microstriations corresponding to one of the machining operations while the other of the ring gear and pinion would have microstriations corresponding to the other of the machining operations.

As is readily observed from FIG. 9, the microstriations 30 formed by grinding and subsequent honing extend across the surface of the flank approximately parallel to the tooth root. Conversely, the microstriations formed by grinding only 32 extend diagonally across the tooth flank. As such, when the ring gear 10 and pinion 12 mesh together, the microstriations of one gear are offset relative to the microstriations of the other gear. While FIG. 9, for ease of understanding, shows only a small number of microstriations extending across the surfaces of the gear tooth flanks, there are actually a plurality of microstriations on each tooth flank, each successively positioned in a side by side relationship relative to one another. Due to the angular offset of the microstriations generated by grinding and honing relative to those generated by grinding only, the noise generated by a bevel gear pair made in accordance with the above-described machining processes will approximate that formerly achieved only by using a matched and lapped ring gear and pinion pair. This is evidenced by FIG. 5.

Figure 1:
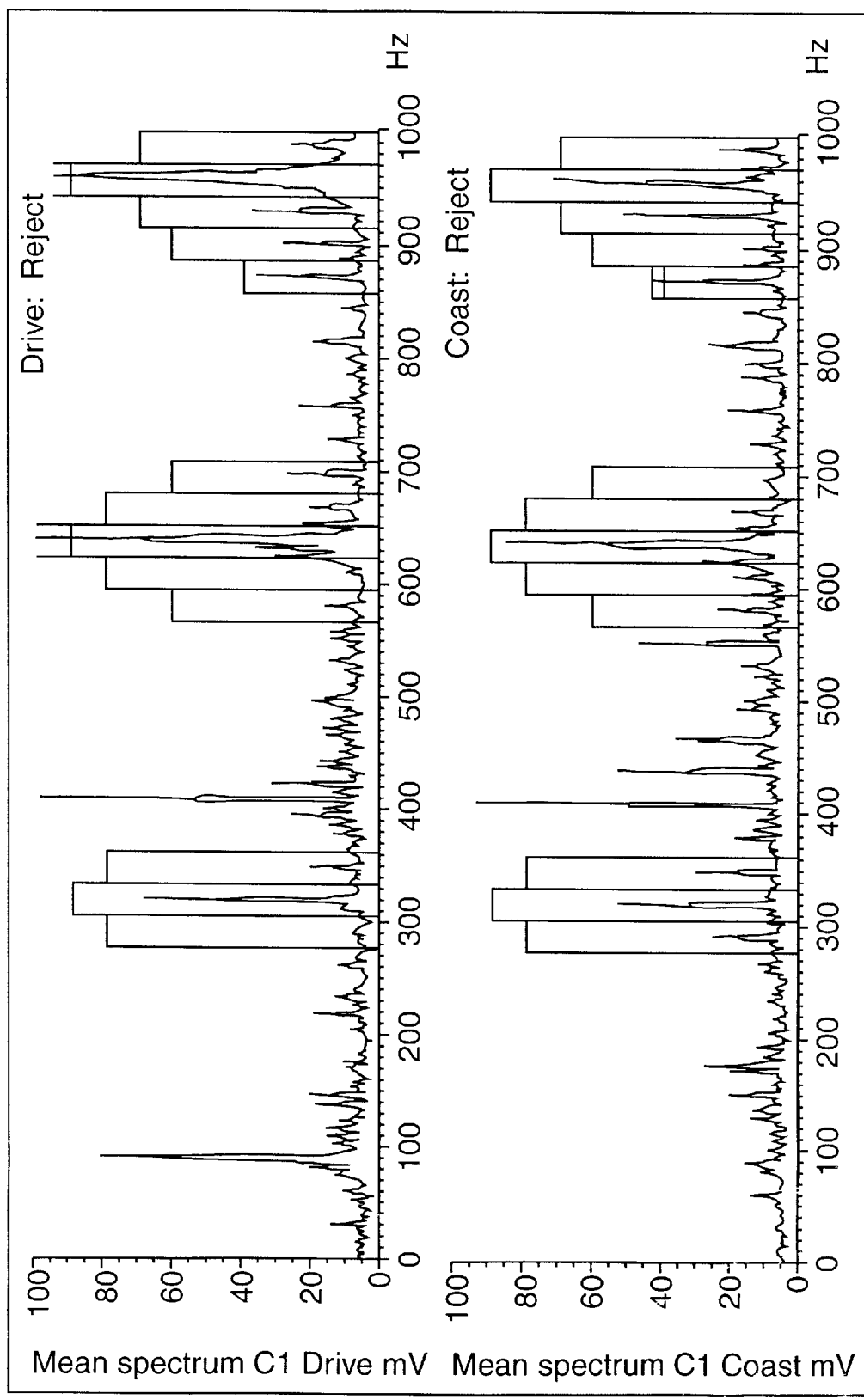
FIGS. 1–4 graphically depict the noise generation characteristics of bevel gear pairs made in accordance with prior art machining techniques.
Figure 2:
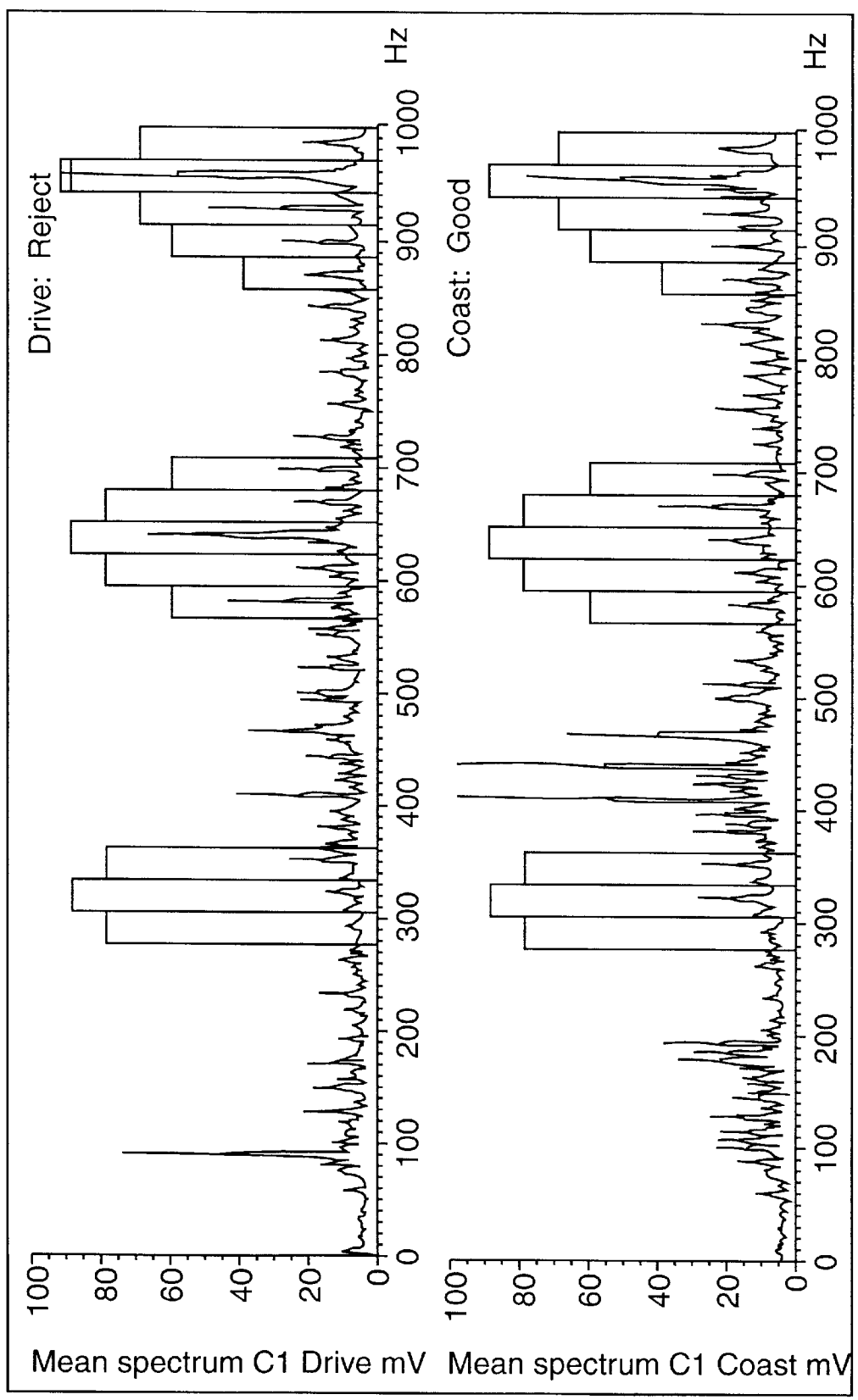
Figure 3:
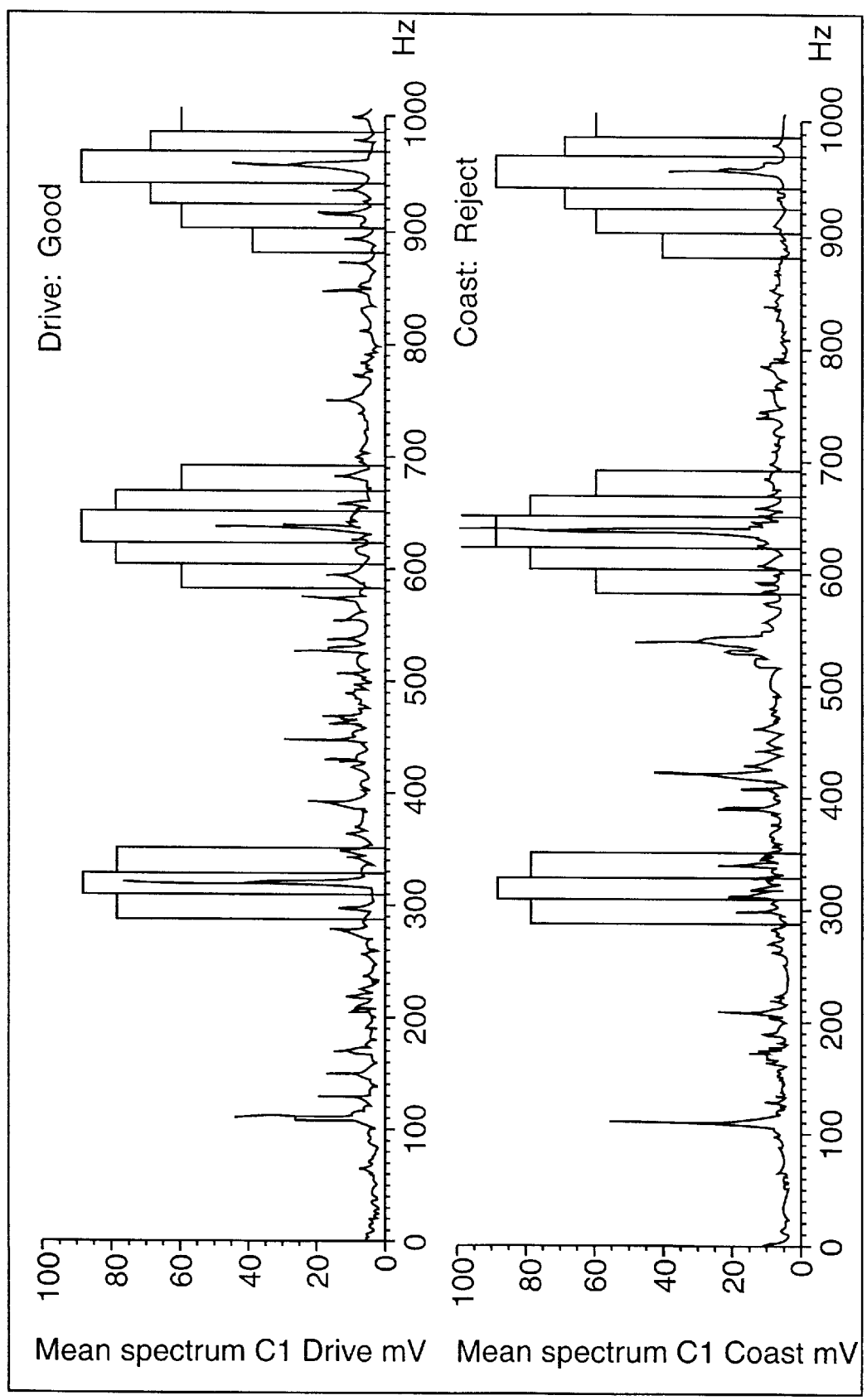
Figure 4:
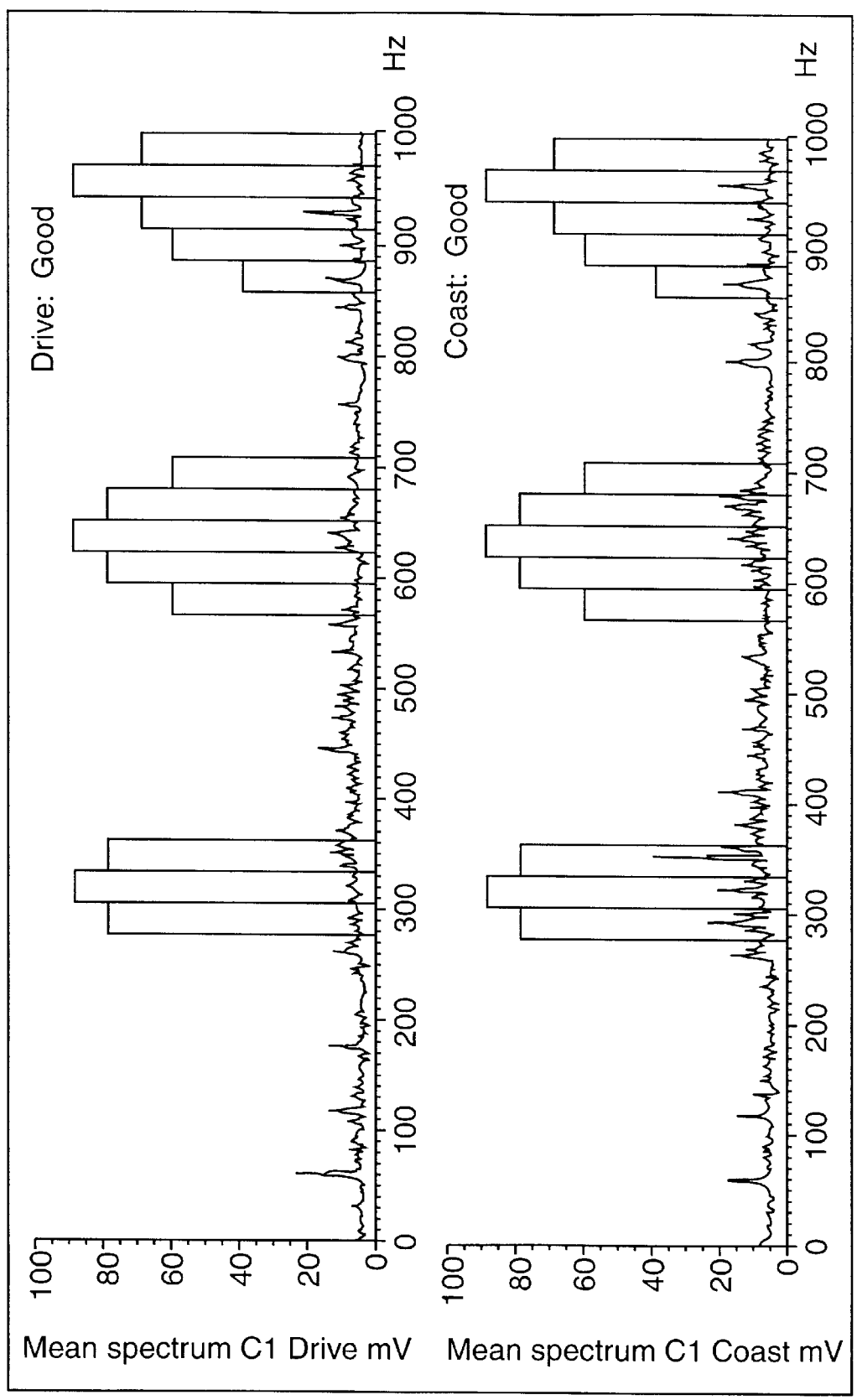
Figure 5:
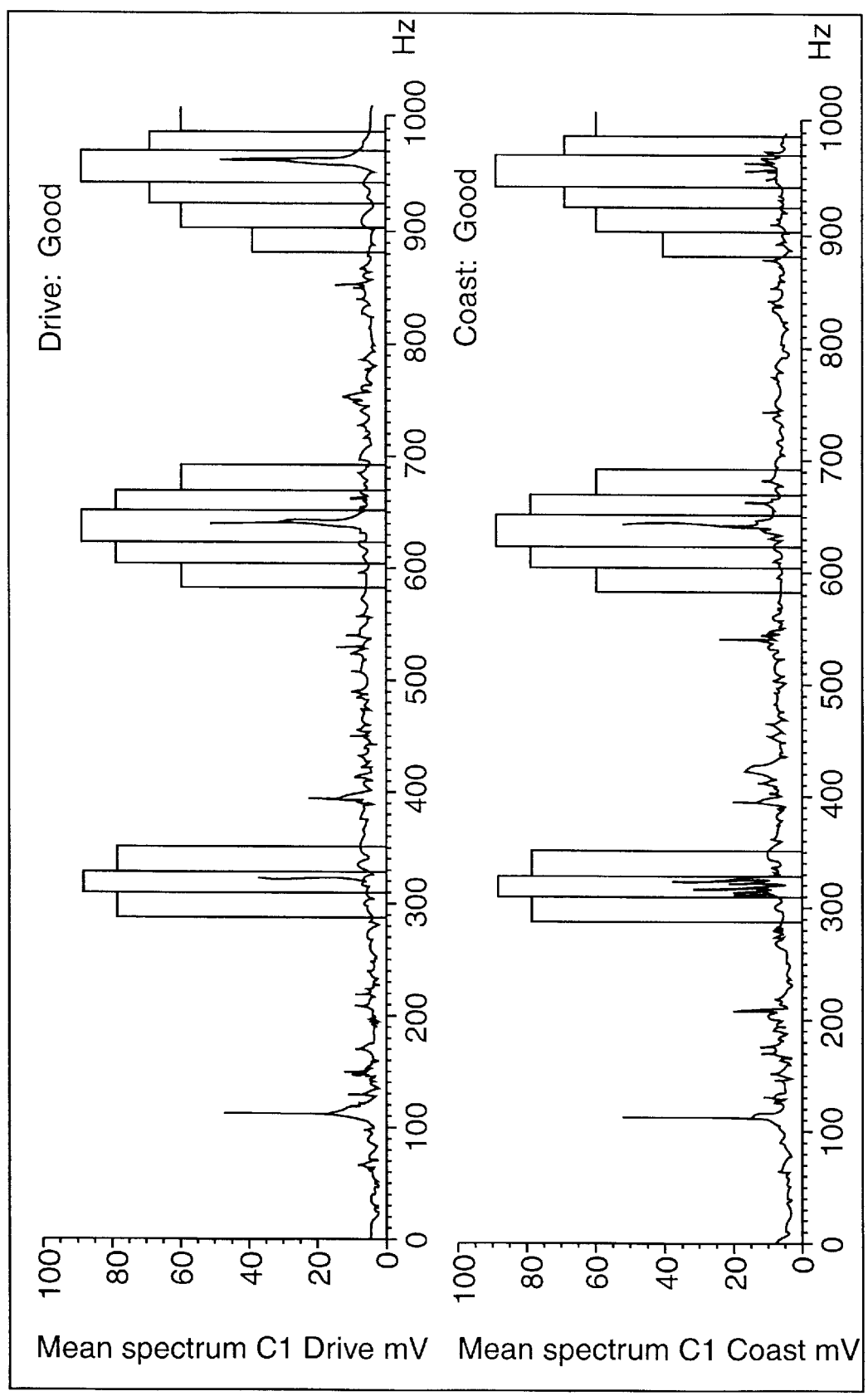
FIG. 5 graphically illustrates the spectrum of the acceleration level over the frequency of a bevel gear pair in accordance with the present invention.

The comparison of the measurement results in accordance with FIGS. 3 and 4 described at the outset has made clear the positive result achieved by grinding and subsequent lapping. FIG. 5 shows the result obtained when a honed pinion is paired with a ground ring gear. The noise generated is practically at the level shown in FIG. 4 for a bevel gear pair where both gears are ground and lapped. However, the result shown in FIG. 5 was achieved in a more economic manner due to the fact that the grinding process need not be as accurate. In addition, the pinion 12 is honed in the same chucking in the same machine as used for grinding. In this way, the disadvantages connected with lapping are avoided.

Although in the above described embodiment the pinion 12 is honed in the same chucking as during grinding (FIG. 7) and on the same machine, it is also possible to perform the honing and grinding operations on separate machines, or on a machine with a spindle on which two different processing heads are sequentially mounted.

A further method would consist of omitting the grinding step prior to honing and the hardened bevel gear would only be finished by honing. Only one honing machine would be required for this. The other bevel gear of the pair would be ground.

As will be recognized by those skilled in the pertinent art, numerous changes and modifications may be made to the above-described and other embodiments of the present invention without departing from its scope as defined in the appended claims. Accordingly, the detailed description of the preferred embodiments herein is to be taken in an illustrative as opposed to a limiting sense.

What is claimed is:

1. A bevel gear pair comprising:

a pinion having a plurality of first gear teeth each defined at least in part by a tooth root and convex and concave flank surfaces, said flank surfaces each defining a plurality of microstriations extending thereacross;

a ring gear having a plurality of second gear teeth meshable with said first gear teeth, each of said second gear teeth being defined at least in part by a tooth root and convex and concave flank surfaces, each of said flank surfaces having a plurality of microstriations defined thereby;

said microstriations of said pinion being oriented along a meshing direction established when said ring gear and pinion are operated together, and said microstriations defined by said flank surfaces of said ring gear extending approximately parallel to said root of each of said second gear teeth; and whereby said pinion and said ring gear are produced individually and can be randomly chosen from a plurality of ring gears and pinions and be operated together to generate noise levels approximately equivalent to those of match bevel gear pairs.

* * * * *

UNITED STATES PATENT AND TRADEMARK OFFICE
CERTIFICATE OF CORRECTION

PATENT NO.    : 6,481,307 B1
DATED         : November 19, 2002
INVENTOR(S)   : Klingelnberg It is certified that error appears in the above-identified patent and that said Letters Patent is hereby corrected as shown below:

<u>Title page,</u>
Item [*] Notice, "Subject to any disclaimer, the term of this patent is extended or adjusted under 35 USC 154(b) by (37) days", delete the phrase "by 37 days" and insert -- by 0 days --

Signed and Sealed this

Twenty-first Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,481,307 B1  Page 1 of 1
DATED : November 19, 2002
INVENTOR(S) : Diether Klingelnberg It is certified that error appears in the above-identified patent and that said Letters Patent is hereby corrected as shown below:

<u>Title page,</u>
Item [*] Notice, please delete "37 days" and insert -- 0 days --.

Signed and Sealed this

Fourth Day of November, 2003

JAMES E. ROGAN
*Director of the United States Patent and Trademark Office*